United States Patent
Isogai et al.

(10) Patent No.: US 9,296,410 B2
(45) Date of Patent: Mar. 29, 2016

(54) STEERING DEVICE

(71) Applicant: YAMADA MANUFACTURING CO., LTD., Kiryu-shi (JP)

(72) Inventors: Shigetaka Isogai, Kiryu (JP); Yasuyuki Shibusawa, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 14/560,927

(22) Filed: Dec. 4, 2014

(65) Prior Publication Data

US 2015/0166095 A1   Jun. 18, 2015

(30) Foreign Application Priority Data

Dec. 17, 2013  (JP) ................................. 2013-260698

(51) Int. Cl.
*B62D 1/184* (2006.01)
*B62D 1/18* (2006.01)
*B62D 1/185* (2006.01)

(52) U.S. Cl.
CPC *B62D 1/18* (2013.01); *B62D 1/184* (2013.01); *B62D 1/185* (2013.01)

(58) Field of Classification Search
CPC ........... B62D 1/18; B62D 1/184; B62D 1/185
See application file for complete search history.

(56) References Cited

U.S. PATENT DOCUMENTS

| | | | | | |
|---|---|---|---|---|---|
| 3,318,170 | A | * | 5/1967 | Runkle | B62D 1/185 403/345 |
| 4,572,023 | A | * | 2/1986 | Euler | B62D 1/184 280/775 |
| 5,685,565 | A | * | 11/1997 | Schafer et al. | B62D 1/192 280/777 |
| 6,354,626 | B1 | * | 3/2002 | Cartwright | B62D 1/184 280/775 |
| 7,163,462 | B2 | * | 1/2007 | Okude et al. | F16C 3/03 464/182 |
| 2007/0126222 | A1 | * | 6/2007 | Koya et al. | B62D 1/185 280/775 |

FOREIGN PATENT DOCUMENTS

JP        06-241238 A       8/1994

* cited by examiner

*Primary Examiner* — Paul N Dickson
*Assistant Examiner* — Timothy Wilhelm
(74) *Attorney, Agent, or Firm* — McGinn IP Law Group, PLLC (57) ABSTRACT

A steering device includes an upper shaft, a lower shaft, and a cover member having a large inner-diameter portion and a small inner-diameter portion, and a sealing member. A portion to be locked is formed close to the upper side of the lower shaft, the sealing member is locked and attached to the portion to be locked, the upper shaft and the lower shaft are slidably connected through the outer spline and the inner spline, and the cover member covers a connection portion connecting the upper shaft and the lower shaft. The upper end of the cover member is fixed to the upper side of the upper shaft. The sealing member is not in contact with the large inner-diameter portion of the cover member. The sealing member comes into contact with the inner circumferential surface of the small inner-diameter portion by reaching the small inner-diameter portion of the sealing member in the extension process of the upper shaft and the lower shaft.

5 Claims, 5 Drawing Sheets

STEERING DEVICE

BACKGROUND OF THE INVENTION

1. Field of the Invention

The present invention relates to a steering device equipped with an axially telescopic shaft constituted by an upper shaft with an outer spline formed therein and a lower shaft with an inner spline formed therein, and more particularly to a steering device having a telescopic function which is advantageous for vehicles, such as cab-over trucks, in which the entire cabin (cab) is rotated and power components as represented by an engine are exposed to the outside.

2. Description of the Related Art

There are a large number of cab-over trucks. In such trucks, the vehicle cab is opened and closed by rotation about the front lower end thereof as a rotation center, so as to expose the power components as represented by the engine to the outside, and, for example, the inspection of equipment is performed. When the cab is rotated and, for example, the inspection is performed, the entire steering device is rotated together with the cab.

The lower end portion of the steering device is connected to the steering unit of the front wheels, and when the cab is rotated and opened, a telescopic portion provided at part of the shaft constituting the steering device moves telescopically along the axial direction. An example of such steering device is disclosed in Japanese Patent Application Publication No. H6-241238.

The contents of Japanese Patent Application Publication No. H6-241238 are briefly described below. The reference numerals used herein are those of Japanese Patent Application Publication No. H6-241238. Initially, a spline tube 9 having a female spline on the inner circumferential surface and a spline shaft 10 having a male spline groove on the outer circumferential surface are engaged with each other. A sealing member 19 produced from an elastic material such as a rubber is externally fitted and fixed to the upper end portion of the spline tube 9, and the sealing member 19 maintains a water-tight state between the inner circumferential edge of the upper end opening of the spline tube 9 and the outer circumferential surface of the intermediate portion of the spline shaft 10.

The sealing member 19 has a support tubular portion 23 that can be externally fitted on and supported by the upper end portion of the spline tube 9 and a bent portion 24 of an inward flange shape that is provided at the upper end of the support tubular portion 23 and formed by bending diametrically inward while protruding upward from the upper end edge of the spline tube 9. First sealing lips 29 are formed at a portion that is slightly above the lower end edge of the support tubular portion 23 at the inner circumferential surface of the support tubular portion 23.

The first sealing lips 29 are of a comparatively small thickness and low rigidity. Therefore, when a difference in pressure occurs between the two sides of the first sealing lips 29, they are elastically deformed in a comparatively easy manner and the air freely circulates through third gaps 28. In the sealing member 19, a second sealing lip 30 is formed at the inner circumferential edge of the bent portion 24.

The inner circumferential edge of the second sealing lip 30 is in contact with the outer circumferential surface of the spline shaft 10 over the entire circumference. The second sealing lip 30 is of the so-called self-sealing type, and the inner circumferential edge thereof is pressed against the outer circumferential surface of the spline shaft 10 by the pressure of the fluid which is to be sealed. Therefore, the second sealing lip 30 is less likely to deform in the direction in which the seal is broken by a pressure change than the first sealing lip 29.

When, for example, muddy water that has adhered to the outer circumferential surface of the spline shaft 10 flows down along the outer circumferential surface, the second sealing lip 30 blocks this flow and the muddy water is prevented from penetrating into the spline tube 9. Where the shaft is telescopically moved in order to, for example, adjust the height position of a steering wheel 1, the air pressure inside the spline tube 9 changes.

For example, when the steering wheel 1 is lowered and the shaft is contracted, the pressure inside the spline tube 9 rises. This pressure is applied to the upper surface of the first sealing lips 29 through the first, second, and third gaps 20, 25, 28, causes the first sealing lips 29 to deform elastically downward, and separates the inner circumferential edge of the first sealing lips 29 from the bottom surface of valley portions 27.

As a result, the inside and outside of the spline tube 9 communicate with each other through the first, second, and third gaps 20, 25, 28, and the air located inside the spline tube 9 is discharged. Conversely, where the steering wheel 1 is raised and the shaft is extended, the pressure inside the spline tube 9 decreases.

Under the effect of the atmospheric pressure applied to the lower surface of the first sealing lips 29, the first sealing lips 29 are elastically deformed upward, the inner circumferential edges of the first sealing lips 29 are separated from the bottom surface of the valley portions 27, and the external air is introduced into the spline tube 9.

SUMMARY OF THE INVENTION

The following problems are associated with the configuration described in Japanese Patent Application Publication No. H6-241238. First, the inner circumferential edges of the first sealing lips 29 are in contact with the outer circumferential surface of the spline tube 9, and the inner circumferential edges of the second sealing lips 30 are in contact with the outer circumferential surface of the spline shaft 10 over the entire circumference. As a result, a sliding load acting at the time of telescopic sliding increases and operability is degraded. Further, since the first sealing lip 29 and the second sealing lip 30 are in contact with the outer circumferential surface of the shaft at all times, the sealing lips 29, 30 can be damaged by friction when the shaft slides.

In trucks, a cab is sometimes rotated forward after a long-distance travel, components around the engine are inspected, and the equipment is washed. Grease is sometimes filled in the shaft fitting portion in the course of maintenance. Where the cab (cabin) is returned from the open state to the usual closed state after the grease has been filled, the shaft slides, and the extra grease is discharged from the shaft fitting portion to the outside. Since the sealing member 19 described in Japanese Patent Application Publication No. H6-241238 is of a cap shape, the sealing member 19 can be displaced and damaged by the grease.

Accordingly, it is an objective of (a technical problem to be resolved by) the present invention to provide a steering device equipped with a telescopic mechanism, in which the sealing material is unlikely to be displaced and damaged during the telescopic movement of the shaft, and smooth telescopic movement can be performed while preventing the penetration of, for example, muddy water into the shaft fitting portion and the displacement of the cover member.

The inventors have conducted a comprehensive study aimed at the resolution of the above-described problems and have resolved the problems by providing a steering device of the first embodiment of the invention, the steering device including: an upper shaft having an outer spline; a lower shaft having an inner spline; a cover member of a cylindrical shape having a large inner-diameter portion and a small inner-diameter portion on an inner circumferential side of the cover member; and an annular sealing member, wherein a portion to be locked is formed in a circumferential direction on an outer circumference close to an upper side of the lower shaft, the annular sealing member is locked and attached to the portion to be locked, the upper shaft and the lower shaft are slidably connected through the outer spline and the inner spline, the cover member covers a connection portion connecting the upper shaft and the lower shaft, an upper end of the cover member is fixed to an upper side of the upper shaft, an outer circumference of the sealing member is not in contact with an inner circumferential surface of the large inner-diameter portion of the cover member, and the sealing member comes into contact with the inner circumferential surface of the small inner-diameter portion by reaching the small inner-diameter portion of the sealing member in an extension process of the upper shaft and the lower shaft.

The above-described problems are also resolved by a steering device of the second embodiment of the invention which is the steering device of the first embodiment, wherein a small gap is formed between the outer circumference of the lower shaft and the small inner-diameter portion of the cover member. The above-described problems are also resolved by a steering device of the third embodiment of the invention which is the steering device of the first or second embodiment, wherein a portion to be fitted is formed at an upper side of the upper shaft, a fitting portion protruding on an inner circumferential side toward a center is formed at an upper end of the cover member, and the fitting portion is fitted and fixed to the portion to be fitted through a fixing member. The above-described problems are also resolved by a steering device of the fourth embodiment of the invention which is the steering device of the first or second embodiment, wherein the small inner-diameter portion of the cover member is formed in a short range from a lower end of the cover member.

The above-described problems are also resolved by a steering device of the fifth embodiment of the invention which is the steering device of the first or second embodiment, wherein a sealing portion is formed at the sealing member, an annular locking portion is formed along the circumferential direction on an inner circumferential side of the sealing portion, a cross section perpendicular to the circumferential direction of the sealing portion has a triangular shape, and the locking portion is formed to protrude at an intermediate location in a through direction of an axial hole on an inner circumferential surface of the sealing portion.

In accordance with the present invention, the sealing member is in contact with the inner circumferential side of the cover member only when the upper shaft and the lower shaft are extended substantially to a maximum limit. Since the sealing member and the cover member are not in contact in the extension process of the sliding shaft, the sealing member is not scratched or damaged by friction, or the like, at the time of the telescopic sliding of the steering device or rotation of the cabin (cab), and the durability thereof is increased.

Further, when the upper shaft and lower shaft are extended to the maximum limit, that is when the cabin (cab) is rotated, the inner circumferential side of the cover member and the sealing member come into contact with each other. Therefore, for example, water or mud can be reliably prevented from penetrating into the cover member at the time of washing.

DESCRIPTION OF THE PREFERRED EMBODIMENTS

Figure 1A:
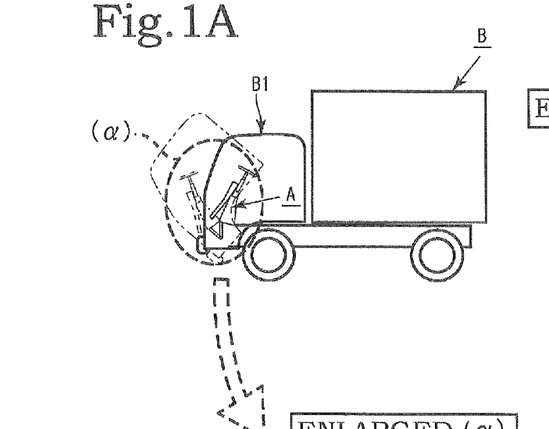
FIG. 1A is a schematic diagram of a truck in a state in which the steering device of the present invention is mounted thereon.
Figure 1B:
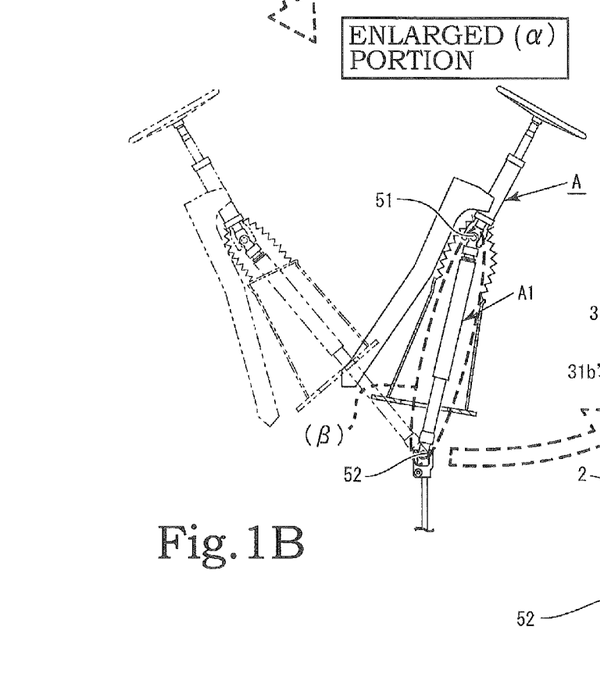
FIG. 1B is an enlarged view in a partial cross section of portion (α) depicted in FIG. 1A.

The embodiments of the present invention will be described hereinbelow with reference to the appended drawings. As depicted in FIGS. 1A and 1B, the present invention relates to a steering device A which is to be mounted mainly on a vehicle, e.g., a truck, in which a cabin (cab) B1 is rotated forward about the front lower end thereof to, for example, inspect an engine (see FIG. 1A).

When the cabin (cab) B1 of a truck B is rotated, the steering device A is also rotated significantly along a substantially circular-arc trajectory. The invention relates to a sliding shaft A1 which is a part (see FIG. 1B) constituting the steering device A, serves to transmit the rotation from a steering wheel and a steering shaft to a steering unit of front wheels, and moves telescopically in the axial direction (see FIGS. 1A and 1B).

Figure 1C:
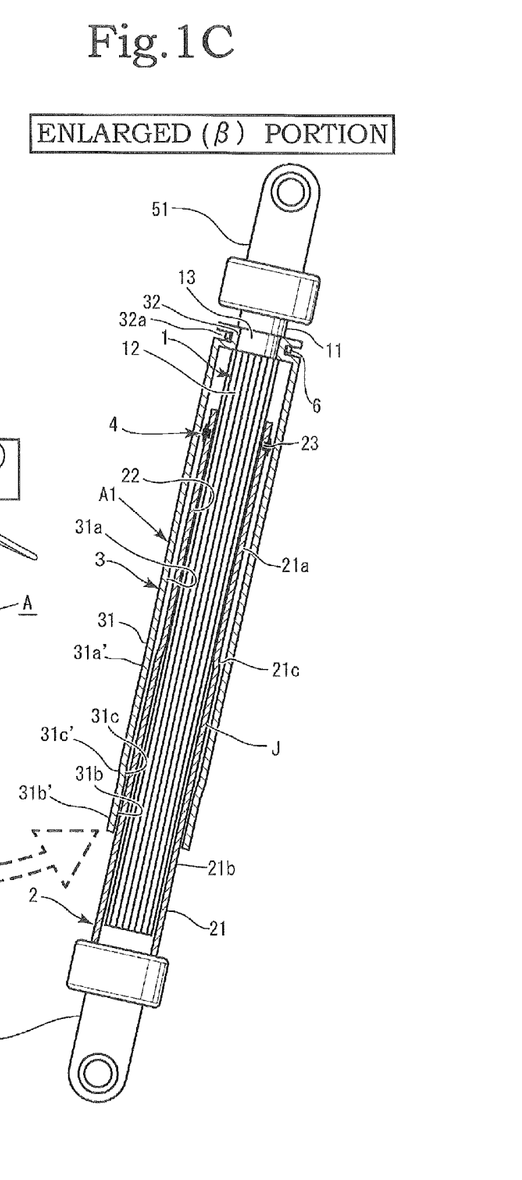
FIG. 1C is an enlarged view in a partial cross section of portion (β) depicted in FIG. 1B.

The sliding shaft A1 is mainly constituted by an upper shaft 1, a lower shaft 2, a cover member 3, and a sealing member 4 (see FIG. 1C). In the present invention, a vertical direction is set for the steering device, the side on which the steering wheel is mounted is taken as an upper side, and a side connected to the steering unit of front wheels is taken as a lower side (see FIGS. 1A-1C).

Figure 2A:
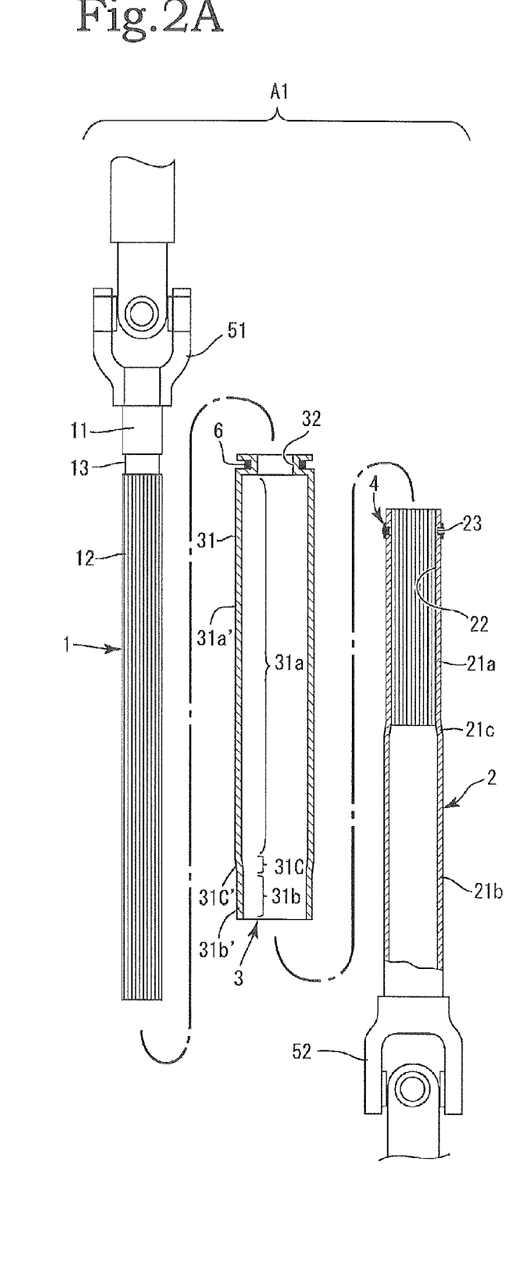
FIG. 2A is an exploded view in a partial cross section of the sliding shaft of the present invention.
Figures 3A, 3B:
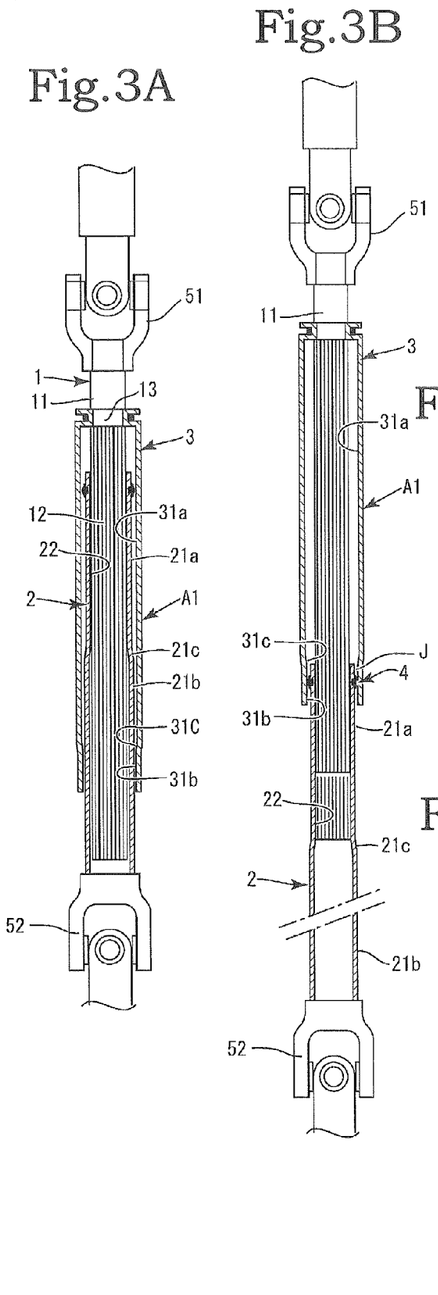
FIG. 3A is a side view in a partial cross section illustrating the minimal contracted state of the sliding shaft.
FIG. 3B is a side view in a partial cross section illustrating the maximum extended state of the sliding shaft.
Figure 3C:
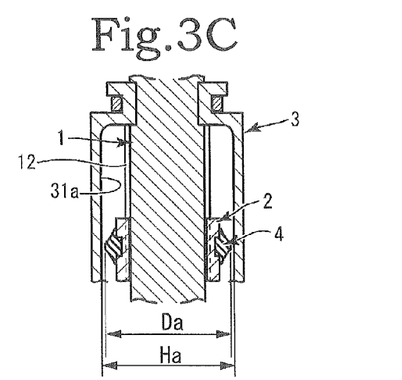
FIGS. 3C-3E are principal vertical sectional views of various states in the telescopic motion of the sliding shaft.
Figure 3D:
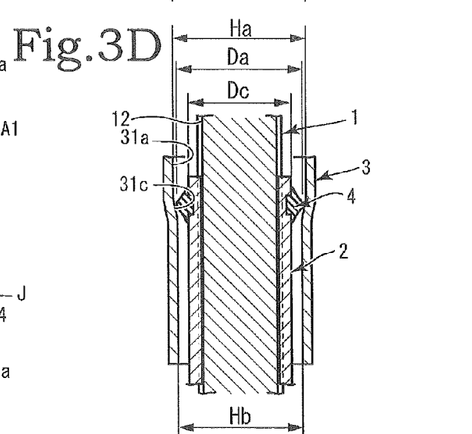
Figure 3E:
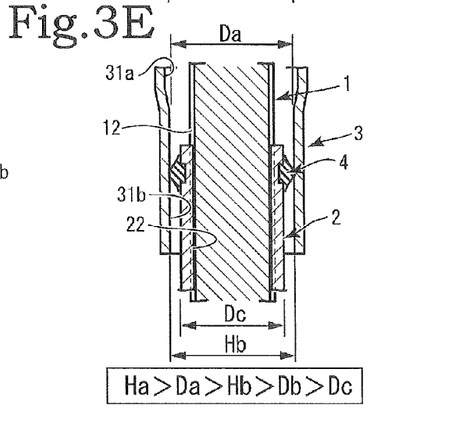

The upper shaft 1 and the lower shaft 2 are connected by splines along the axial direction, and the connection portion thereof is covered by the cover member 3 (see FIG. 1C and FIGS. 3A and 3B, for example). In the upper shaft 1, an outer spline 12 is formed on the outer circumferential side of a shaft main body 11 substantially over the entire shaft main body in the axial direction. An upper yoke 51 is mounted on the upper end of the upper shaft 1. A portion 13 to be fitted is formed at an upper location of the upper shaft 1. The portion 13 to be fitted is formed as a groove with a concave cross-sectional shape along the circumferential direction of the outer circumference of the shaft main body 11 (see FIG. 2A).

In the lower shaft 2, an inner spline 22 is formed on the inner circumferential side of a tubular main body 21 of a hollow tubular shape (see FIG. 2A). A lower yoke 52 is fixedly attached to the lower end of the lower shaft 2. A circumferential portion 23 to be locked is formed along the circumferential direction on the upper side on the outer circumferential side of the lower shaft 2.

The lower shaft 2 has a small-diameter portion 21a and a large-diameter portion 21b along the axial direction and on the outer circumferential side. The small-diameter portion 21a is positioned on the upper side of the lower shaft 2, and the large-diameter portion 21b is positioned on the lower side. A step 21c is formed as a boundary portion of the small-diameter portion 21a and the large-diameter portion 21b (see FIGS. 2A and 2C). The step 21c is formed in a conical shape to enable a smooth transition from the small-diameter portion 21a to the large-diameter portion 21b (see FIG. 2C). The upper shaft 1 and the lower shaft 2 are made from a metal.

Figure 2B:
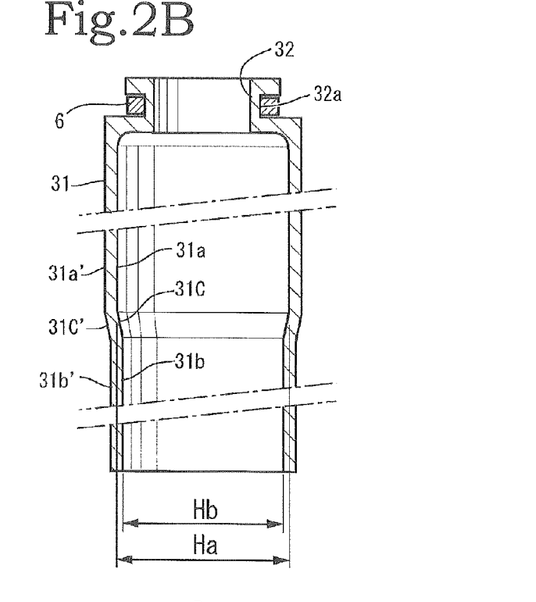
FIG. 2B is a vertical sectional view of the cover member in which the intermediate portion is omitted.

The cover member 3 is a tubular member formed in a substantially hollow cylindrical shape and constituted by a cover main body 31 and a fitting portion 32 (see FIGS. 2A and 2B). The fitting portion 32 is formed at the upper end of the cover main body 31. The fitting portion 32 is a part protruding from the inner circumferential side of the cover main body 31, so as to form a substantially annular shape along the diametrical center thereof (see FIG. 2B).

The cover member 3 is fixed to the upper shaft 1 by fitting the fitting portion 32 into the portion 13 to be fitted of the upper shaft 1. A reinforcing groove 32a is formed on the outer circumferential side of the location where the fitting portion 32 has been formed, and a fixing member 6 such as a spring ring or locking ring can be mounted into the reinforcing groove 32a.

A large inner-diameter portion 31a and a small inner-diameter portion 31b are formed on the inner circumferential side of the cover main body 31 of the cover member 3 (see FIGS. 2A and 2B). The large inner-diameter portion 31a has an inner diameter larger than that of the small inner-diameter portion 31b and provides a wide gap. Further, the large inner-diameter portion 31a is positioned on the upper side of the cover member 3, and the small inner-diameter portion 31b is positioned on the lower side. An inner circumferential step 31c is formed as a boundary portion of the large inner-diameter portion 31a and the small inner-diameter portion 31b. The inner circumferential step 31c is formed in a conical shape to ensure a smooth transition from the large inner-diameter portion 31a to the small inner-diameter portion 31b.

The ratio of the axial lengths of the large inner-diameter portion 31a and the small inner-diameter portion 31b is set such that the axial length of the large inner-diameter portion 31a is several times the axial length of the small inner-diameter portion. More specifically, the axial length of the large inner-diameter portion 31a is from about two times to about ten times the axial length of the small inner-diameter portion 31b.

In other words, the small inner-diameter portion 31b is formed in a range which is small in the axial length of the cover main body 31 of the cover member 3 and short from the lower end of the cover member 3 (see FIG. 2A). The length of the small inner-diameter portion 31b is not limited to that indicated hereinabove, and the small inner-diameter portion may be formed to any necessary length (see FIG. 5B).

The cover member 3 is made from a rubber and is elastic in the fitting portion 32, thereby facilitating the fitting on the portion 23 to be fitted of the upper shaft 1. Further, where the fixing member 6 such as a locking ring is mounted into the reinforcing groove 32a, the fitting portion 32 can be reduced in diameter and stronger fitted onto and attached to the portion 23 to be fitted.

The cover member 3 is constituted by a large-diameter outer circumferential portion 31a' of a large diameter that corresponds to the large inner-diameter portion 31a and a small-diameter outer circumferential portion 31b' of a small diameter that corresponds to the small inner-diameter portion 31b. An outer circumferential step 31c' corresponding to the inner circumferential step 31c is formed in a conical shape (see FIG. 2A).

The sealing member 4 is formed annularly (or in a ring shape) and locked and fixed to the portion 23 to be locked of the lower shaft 2. The sealing member 4 is constituted by a sealing portion 41 and a locking portion 42, and the sealing member 4 is fixed to the lower shaft 2 as a result of inserting the locking portion 42 into the portion 23 to be locked.

The sealing portion 41 is formed to have a substantially triangular cross section perpendicular to the circumferential direction. More specifically, inclined surfaces 41b which are symmetrical in the left-right direction are formed from both sides of a distal end portion 41a (see FIGS. 2C and 4A). The two inclined surfaces 41b are formed in a substantially concave circular arc shape. The two inclined surfaces 41b may be also formed to have a linear inclined or circular arc shape.

The locking portion 42 is formed to protrude annularly at the inner circumferential surface 41c of the sealing portion 41 along the circumferential direction thereof toward the center of the sealing portion 41. The cross-section of the locking portion 42 perpendicular to the circumferential direction has an angular shape such as square or rectangular shape and preferably has substantially the same shape as the portion 23 to be locked.

Figure 4A:
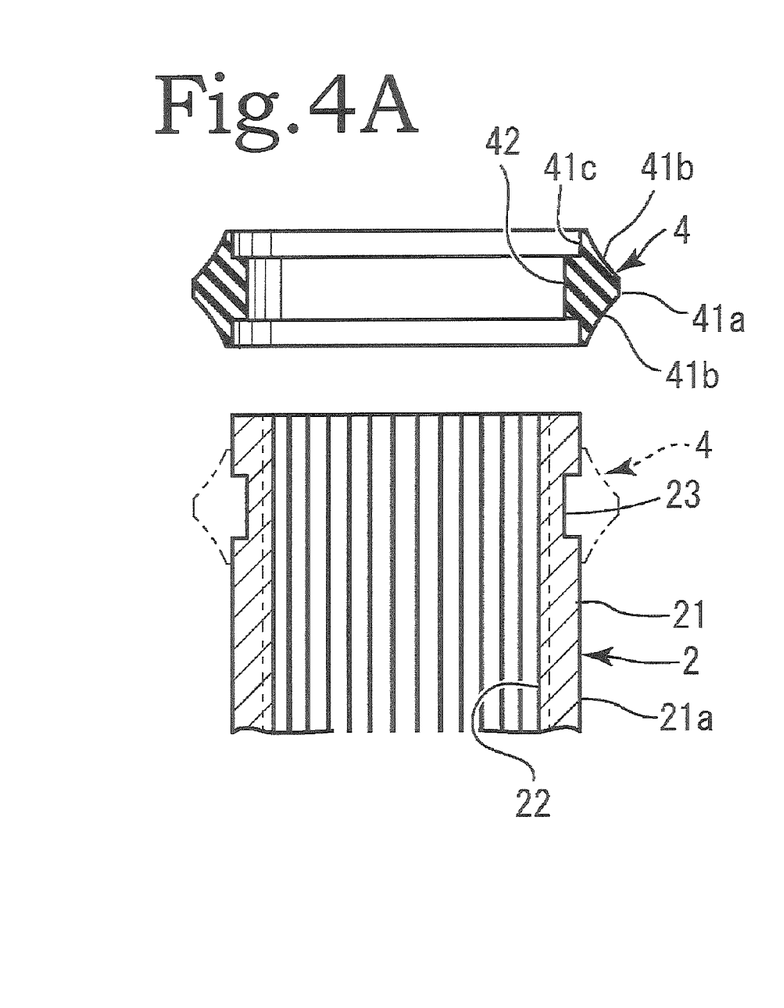
FIG. 4A is a principal enlarged vertical sectional view of a state in which the lower shaft and the sealing member of the first type are separated.
Figure 4B:
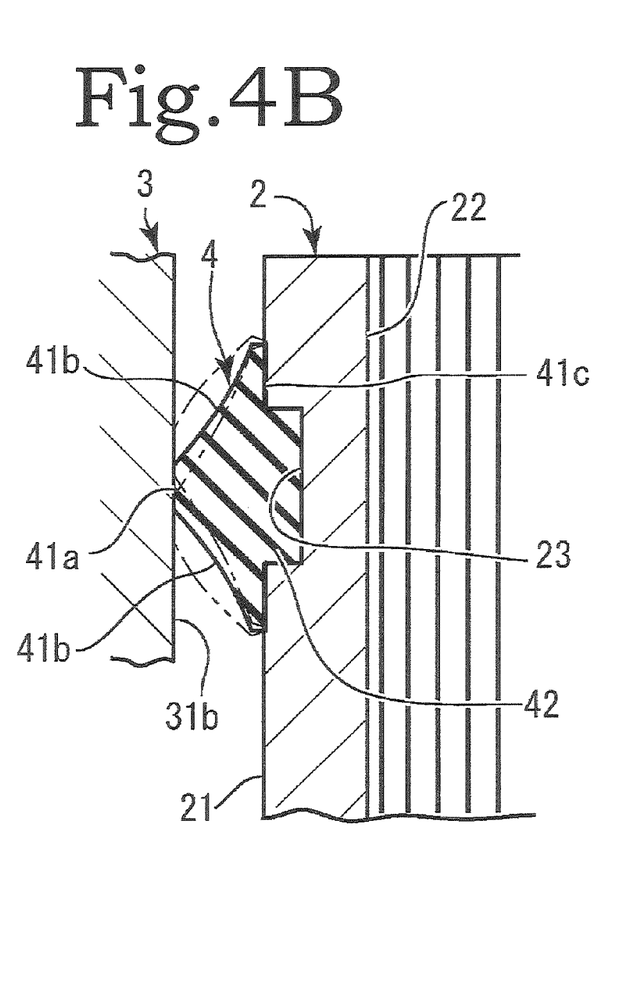
FIG. 4B is a principal enlarged sectional view illustrating the configuration in which the sealing member is unlikely to be displaced from the lower shaft in a state in which the sealing member and the small inner-diameter portion of the cover member are in contact with each other.

Further, the locking portion 42 is formed from the inner circumferential surface 41c of the sealing portion 41 toward a diametrically central location of an axial hole, and the inner circumferential surface 41c of the sealing portion 41 is configured to protrude to a substantially the same distance from both side locations in the through direction of the axial hole of the locking portion 42 (see FIGS. 4A-4B). In this case, the through direction of the axial hole is the direction in which the lower shaft 2 passes through the sealing member 4.

Because of the above-described configuration of the sealing member 4, the sealing member can be very strongly fixed to the portion 23 to be locked of the lower shaft 2. Thus, the sealing member 4 can be toppled and dislocated so as to be turned up by the contact pressure applied by the sealing portion 41 and the small inner-diameter portion 31b to each other when the cabin (cab) B1 of the truck B is rotated, the sliding shaft A1 of the steering device A extends, and the sealing portion 41 of the sealing member 4 and the small inner-diameter portion 31b of the cover member 3 slide while being in contact with each other.

By contrast, because of the configuration in which the inclined surfaces 41b which are symmetrical in the left-right direction are formed at both sides of the distal end portion 41a of the sealing portion 41 and the inner circumferential surface 41c of the sealing member 4 protrudes from both sides in the through direction of the axial hole of the locking portion 42, the protruding portions come into intimate contact with the outer circumferential surface of the lower shaft 2 in the vicinity of the portion 23 to be locked. Further, the portion of the inner circumferential surface 41c that protrudes from the locking portion 42 in the sealing member 4 acts to prevent the sealing member 4 from toppling, and the sealing member 4 can be very reliably prevented from displacing from the portion 23 to be locked of the lower shaft 2 (see FIGS. 2C and 4A).

Further, because of a structure in which only the distal end portion 41a of the sealing member 4 is in contact with the cover member 3, the surface area of contact with the cover member 3 is small and reliable sealing can be ensured without increasing the sliding load on the sliding shaft A1. In addition to the above-described type, the sealing member 4 may have a substantially angular or semicircular cross section.

The assembly of the sliding shaft A1 in accordance with the present invention is explained below. Initially, the fitting portion 32 of the cover member 3 of the sliding shaft A1 constituted by the upper shaft 1, lower shaft 2, cover member 3, and sealing member 4 is fitted and fixed to the portion 13 to be fit of the upper shaft 1, and the cover member 3 is fitted and fixed to the upper shaft 1. In this case, the fixing member 6 is mounted into the reinforcing groove 32a of the fitting portion 32 and the fitting force is increased.

The locking portion 42 of the sealing member 4 is then locked with the portion 23 to be locked of the lower shaft 2, and the sealing member 4 is attached to the lower shaft 2. The lower shaft 2 and the upper shaft 1 are slidably connected to each other by the inner spline 22 and the outer spline 12. The cover main body 31 of the cover member 3 covers the connection portion J of the lower shaft 2 and the upper shaft 1. In particular, the cover member 3 covers the upper portion of the lower shaft 2 at all times so that the upper end of the lower shaft 2 is not exposed to the outside (see FIGS. 2A and 2B).

The relationship between the diametrical dimensions of the lower shaft 2 and the cover member 3 is explained below. The outer diameter of the sealing member 4 in a state in which the sealing member 4 is mounted on the lower shaft 2 is denoted by Da. The outer diameter of the large-diameter portion 21b of the lower shaft 2 is denoted by Db. The outer diameter of the small-diameter portion 21a is denoted by Dc. The inner diameter of the large inner-diameter portion 31a of the cover member 3 is denoted by Ha. The inner diameter of the small inner-diameter portion 31b of the cover member 3 is denoted by Hb.

Figure 2C:
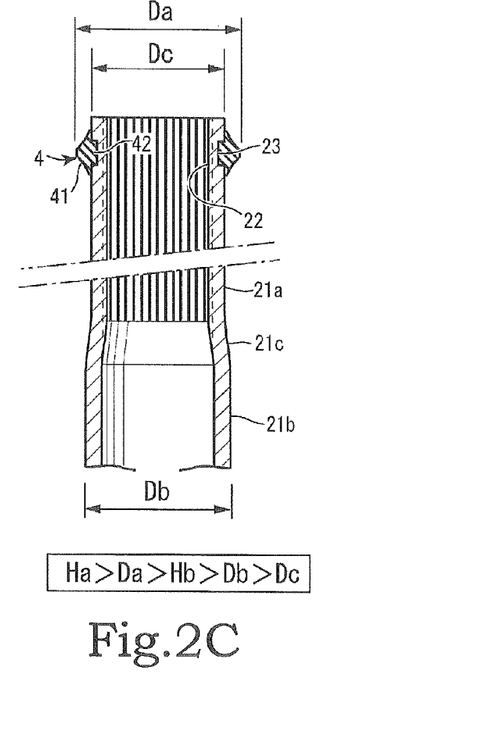
FIG. 2C is a vertical sectional view of the lower shaft in which the intermediate portion is omitted.

The size of the inner diameter Ha of the large inner-diameter portion 31a of the cover member 3 is the largest, and the outer diameter Da of the sealing member 4, the inner diameter Hb of the small inner-diameter portion 31b of the cover member 3, the outer diameter Db of the large-diameter portion 21b of the lower shaft 2, and the outer diameter Dc of the small-diameter portion 21a of the lower shaft 2 can be arranged as follows in the order of decreasing (see FIGS. 2B and 2C).

Ha>Da>Hb>Db>Dc

Because of the dimensional relationship between the locations in the lower shaft 2 and the cover member 3, the outer circumference of the sealing member 4 is not in contact with the inner circumferential surface of the large inner-diameter portion 31a of the cover member 3. In other words, a gap is formed. The sealing portion 41 of the sealing member 4 is in contact with the inner circumferential surface of the small inner-diameter portion 31b of the cover member 3. In this state, the lower shaft 2 and the cover member 3 are sealed by the sealing member 4.

In the usual state in which the cabin (cab) B1 is not rotated, the sealing member 4 is not in contact with the small inner-diameter portion 31b of the cover member 3. In other words, at the time of the usual telescopic adjustment, the sealing member 4 slides axially in a certain range in the large inner-diameter portion 31a of the cover member 3. Therefore, the sealing member 4 is not in contact with the small inner-diameter portion 31b of the cover member 3. Since the sealing member 4 and the cover member 3 are not in contact with each other at the time of telescopic adjustment, a good operation feeling is obtained, without any resistance or obstacles to the telescopic operation. Further, the sealing member 4 is not scratched or damaged by friction or the like and the durability thereof is increased.

Further, in this structure, the cover member 3 is usually not in contact with the lower shaft 2. As a result, at the time of telescopic adjustment or when the cabin (cab) B1 is rotated, the air located inside the shaft fitting portion is discharged to the outside from the gap between the small inner-diameter portion 31b of the cover member 3 and the large-diameter portion 21b of the lower shaft 2, and the sliding load is prevented from increasing.

Further, a grease is sometimes filled in the shaft fitting portion when the cabin (cab) B1 is rotated. Where the cabin (cab) B1 is returned to the usual state after the grease has been filled, the fitting length of the upper shaft 1 and the lower shaft 2 increases. As a result, the entire sliding shaft A1 shrinks in the axial direction.

At this time, since the small inner-diameter portion 31b of the cover member 3 and the large-diameter portion 21b of the lower shaft 2 are not in contact with each other, extra grease is smoothly discharged to the outside and the sliding load is stabilized after the grease has been filled. When the grease is discharged to the outside, the cover member 3 can be prevented from displacing.

Further, the small inner-diameter portion 31b of the cover member 3 is formed in a short range from the lower end of the cover member 3. As a result, when the cabin (cab) B1 is rotated, the sealing member 4 and the small inner-diameter portion 31b are not in contact with each other till the cabin (cab) B1 reaches a position immediately before a substantially fully open state, and the sealing member 4 and the small inner-diameter portion 31b come into contact with each other when the cabin (cab) B1 is substantially fully open. As a result, the sliding resistance created by the contact between the sealing member 4 and the small inner-diameter portion 31b is eliminated and smooth rotational movement of the cabin (cab) B1 can be realized over the entire rotational movement of the cabin (cab) B1.

Further, where the cabin (cab) B1 is rotated, the steering device A also rotates and the upper shaft 1 and the lower shaft 2 move axially outside the telescopic adjustment range. As a result, the sealing portion 41 of the sealing member 4 that is locked to the lower shaft 2 comes into contact with the small inner-diameter portion 31b of the cover member 3 and seals the fitting portion of the sliding shaft A1.

Thus, as a result of the small inner-diameter portion 31b of the cover member 3 and the sealing portion 41 of the sealing member 4 being in contact with each other only when the cabin (cab) B1 is rotated and substantially fully open, the penetration of, for example, water or mud into the shaft fitting portion can be reliably prevented when the vicinity of the lower yoke 52 of the steering device A is washed.

Thus, in the usual state in which the cabin (cab) B1 is not rotated, the sealing member 4 and the cover member 3 are in a contact-free state, the air retained inside at the time of telescopic movement of the sliding shaft A1 can be discharged and smooth telescopic movement which is free of the internal air resistance can be ensured.

Figure 5A:
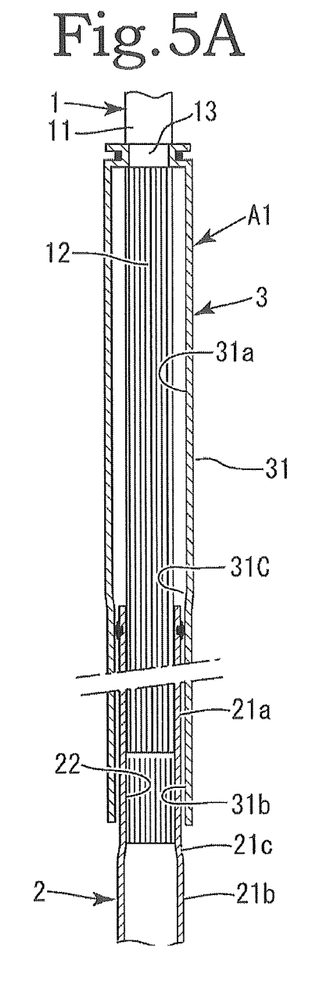
FIG. 5A is a partially simplified vertical sectional view illustrating an embodiment in which the length of the small inner-diameter portion of the cover member is enlarged in the sliding shaft.
Figure 5B:
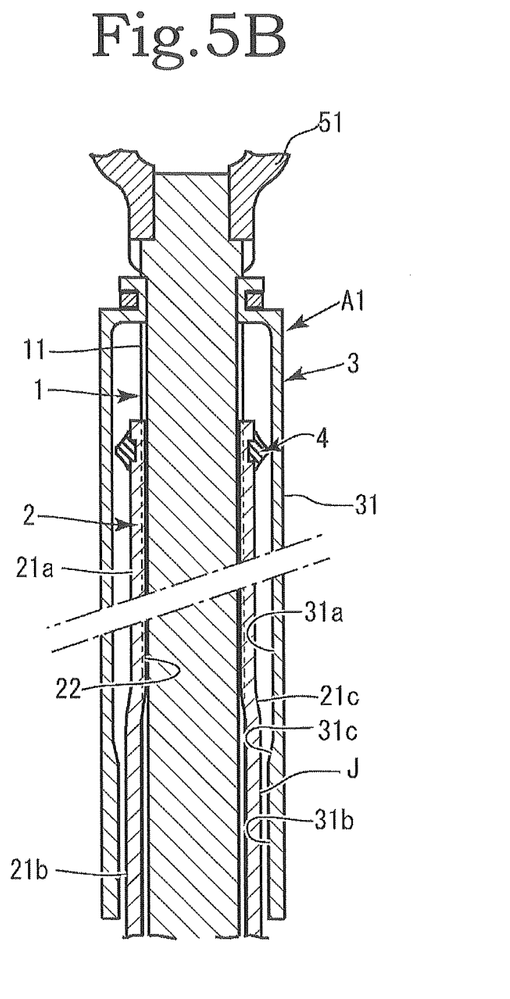
FIG. 5B is a partially simplified vertical sectional view illustrating an embodiment in which a step is eliminated on the outer circumference of the cover member in the sliding shaft.

Further, in a state in which the cabin (cab) B1 is rotated and the sliding shaft A1 is axially extended, the lower shaft 2 and the cover member 3 are sealed by the sealing member 4 and the penetration of water or mud into the sliding shaft A1 can be prevented. FIG. 5B illustrates the second embodiment of the present invention in which the outer circumference of the cover member 3 has the same diameter in the axial direction.

In the second embodiment, a small gap is formed between the outer circumference of the lower shaft and the small inner-diameter portion of the cover member. As a result, during the telescopic movement of the sliding shaft, the air retained inside the cover member can be discharged to the outside, and the sliding load is prevented from increasing. Further, the grease located between the spline-connected upper shaft and lower shaft is smoothly discharged and the cover member can be prevented from displacing.

In the third embodiment, a portion to be fitted is formed at the upper side of the upper shaft, a fitting portion protruding on the inner circumferential side toward a center is formed at the upper end of the cover member, and the fitting portion is fitted and fixed to the portion to be fitted through a fixing member. As a result, the cover member can be strongly fixed to the upper shaft, and mutual axial displacement thereof can be prevented. Such a configuration also has good assemblability.

In the fourth embodiment, the small inner-diameter portion of the cover member is formed in a short range from the lower end of the cover member. As a result, the sealing member and the small inner-diameter portion of the cover member are in contact only when the sliding shaft is extended substantially to a maximum limit thereof. At the intermediate stage of sliding shaft extension, the sealing member and small inner-diameter portion are not in contact with each other. As a result, no sliding resistance occurs, and the sliding shaft is smoothly extended during normal operation and when the cabin (cab) is rotated.

In the fifth embodiment, the sealing portion of the sealing member has a triangular cross-sectional shape, and the locking portion is formed to protrude at an intermediate location in a through direction of an axial hole on the inner circumferential surface of the sealing portion. Thus, a structure is used in which the inner circumferential surface of the sealing portion protrudes from both sides in the through direction of the axial hole of the locking portion. Therefore, the sealing member reliably locks the lower shaft and the contact surface area thereof is expanded. As a result, when the distal end of the sealing portion of the sealing member, which has a triangular cross-sectional shape, and the cover member slide against each other while being in contact, the sealing member is prevented from toppling such as to be turned up along the axial direction, and a reliable sealing structure can be obtained. Further, a linear contact is realized between the distal end of the sealing portion and the cover member and the sliding residence of the sliding shaft can be reduced.

What is claimed is:

1. A steering device comprising:
an upper shaft having an outer spline;
a lower shaft having an inner spline;
a cover member of a cylindrical shape having a large inner-diameter portion and a small inner-diameter portion on an inner circumferential side of the cover member; and
an annular sealing member, wherein
a portion to be locked is formed in a circumferential direction on an outer circumference close to an upper side of the lower shaft,
the annular sealing member is locked and attached to the portion to be locked,
the upper shaft and the lower shaft are slidably connected through the outer spline and the inner spline,
the cover member covers a connection portion connecting the upper shaft and the lower shaft,
an upper end of the cover member is fixed to an upper side of the upper shaft,
an outer circumference of the sealing member is not in contact with an inner circumferential surface of the large inner-diameter portion of the cover member, and
the sealing member comes into contact with the inner circumferential surface of the small inner-diameter portion by reaching the small inner-diameter portion of the cover member in an extension process of the upper shaft and the lower shaft.

2. The steering device according to claim 1, wherein a small gap is formed between the outer circumference of the lower shaft and the small inner-diameter portion of the cover member.

3. The steering device according to claim 1, wherein
a portion to be fitted is formed close to an upper side of the upper shaft,
a fitting portion protruding on an inner circumferential side toward a center is formed at an upper end of the cover member, and
the fitting portion is fitted and fixed to the portion to be fitted through a fixing member.

4. The steering device according to claim 1, wherein the small inner-diameter portion of the cover member is formed in a short range from a lower end of the cover member.

5. The steering device according to claim 1, wherein
a sealing portion is formed at the sealing member, an annular locking portion is formed along the circumferential direction on an inner circumferential side of the sealing portion, a cross section perpendicular to the circumferential direction of the sealing portion has a triangular shape, and
the locking portion is formed to protrude at an intermediate location in a through direction of an axial hole on an inner circumferential surface of the sealing portion.

* * * * *